(12) United States Patent
Chen et al.

(10) Patent No.: US 6,647,173 B2
(45) Date of Patent: Nov. 11, 2003

(54) OPTICAL SWITCH WITH A MOVEABLE OPTICAL COMPONENT

(75) Inventors: Chien Cheng Chen, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 107 days.

(21) Appl. No.: 10/033,653

(22) Filed: Dec. 27, 2001

(65) Prior Publication Data

US 2003/0081885 A1 May 1, 2003

(30) Foreign Application Priority Data

Oct. 31, 2001 (TW) ........................................ 90218612 U (51) Int. Cl.$^7$ ............................... G02B 6/35; G02B 6/32
(52) U.S. Cl. .......................................... 385/18; 385/47
(58) Field of Search ........................ 385/18, 31, 33–35, 385/47

(56) References Cited

U.S. PATENT DOCUMENTS 5,325,459 A * 6/1994 Schmidt ..................... 385/140
5,642,446 A * 6/1997 Tsai ............................. 385/16
6,407,861 B1 * 6/2002 Zhang et al. ................ 359/484
2003/0091268 A1 * 5/2003 Frye et al. .................... 385/18

FOREIGN PATENT DOCUMENTS

JP       61223816 A  * 10/1986  ........... G02B/26/08

* cited by examiner

Primary Examiner—Robert H. Kim
Assistant Examiner—Krystyna Suchecki
(74) Attorney, Agent, or Firm—Wei Te Chung (57) ABSTRACT

An optical switch (99) according to the present invention comprises a housing (30), a first I/O port (10), a second I/O port (50), a driver (23) and a switching element (20). The housing holds the first I/O port and the second I/O port in alignment with a prism (22) having reflective surfaces (221, 222) and supports the driver on a substrate (31) of the housing. A mirror (21) of the switching element is rotationally attached to the driver, and is movable between a first position and a second position. In the first position, light beams from the first and second I/O ports transmit through the prism back to the second and first I/O ports, respectively; in the second position, light beams from the first and second I/O ports are reflected back to the first and second I/O ports by the mirror. Thus light signals from input fibers are switched between two output fibers of the I/O ports.

19 Claims, 6 Drawing Sheets

OPTICAL SWITCH WITH A MOVEABLE OPTICAL COMPONENT

BACKGROUND OF THE INVENTION

1. Field of the Invention

The present invention relates to an optical switch for use in fiber communication and optical network technology, and particularly to a mechanically operated optical switch with a moveable optical component as a switching element.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various methods have been previously developed for switching optical signals between fiber cables. Among these previously developed methods, one important category is mechanical optical switches.

Mechanically operated optical switches come in two different designs: in one design, the optical components move, and in the other design, the fibers move. Factors for assessing the capability of an optical switch include low insertion loss (<1 dB), good isolation performance (>50 dB) and bandwidth capacity compatible with the fiber network the switch is supporting.

Moving fiber switches involve the actual physical movement of one or more of the fibers to specific positions to accomplish the transmission of a light beam from one fiber end to another under selected switching conditions. Moving optical component switches, on the other hand, include optical collimating lenses which expand the light beam coming from the fibers, and then, using moving prisms or mirrors, redirect the expanded light beam to other fibers, as required by the switching process.

The moving fiber switches have a stringent tolerance requirement for the amount and direction of fiber movement. The tolerance is typically a small fraction of the fiber core diameter for two fibers to precisely collimate to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber switches share a common problem of requiring high precision parts to obtain precise position control and low insertion loss. This results in high cost and complicated manufacture of the switches. Moreover, frequently moving fibers to and fro is apt to damage or even break the fibers.

The moving optical component switches, in contrast, have less stringent movement control tolerance requirements. The presence of the collimating lenses allows relaxation of the tolerance requirements.

Figure 7:
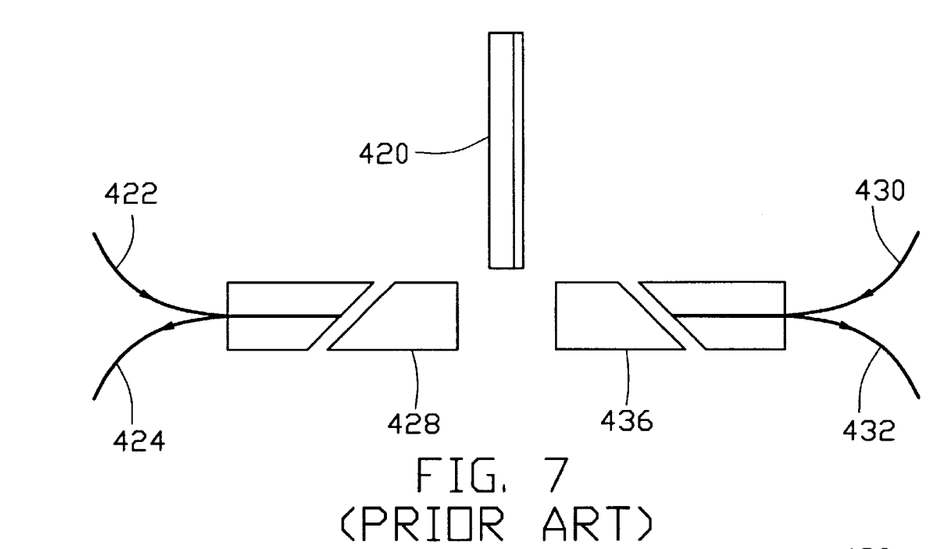
FIG. 7 is an optical elements cross-sectional view of a prior art mechanical optical switch in a first position.
Figure 8:
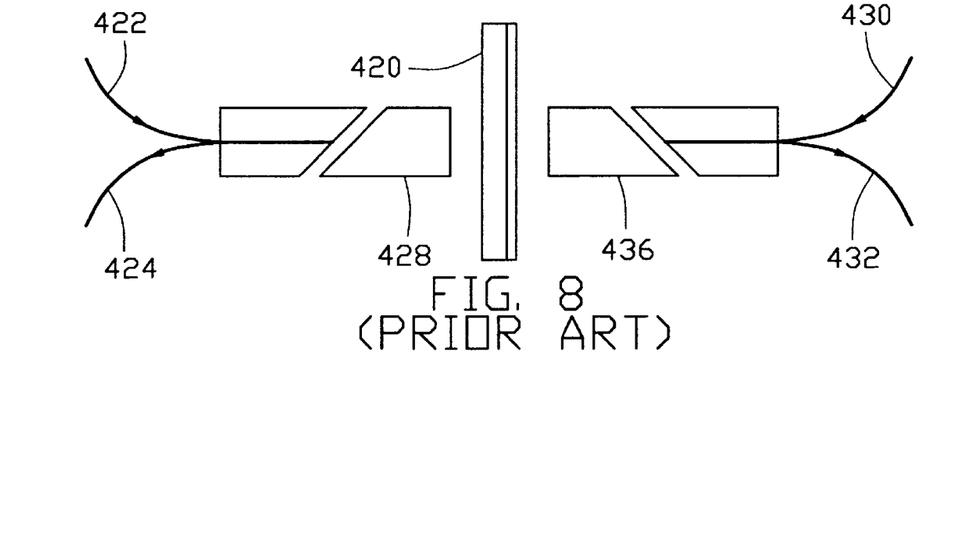
FIG. 8 is an optical elements cross-sectional view of the prior art switch of FIG. 7 in a second position.

As illustrated in FIG. 7 and FIG. 8, U.S. Pat. No. 5,838,847 describes a mechanical optical switch, which relies on a mirror 420 being moveable into an optical path between a first and second fixed collimating lenses (428, 436). When the moveable mirror 420 is displaced out of the optical path (FIG. 7), the light signals from a first input fiber 422 are transmitted to a second output fiber 432 and the light signals from a second input fiber 430 are transmitted to a first output fiber 424 through the first and second collimating lenses (428, 436). However, when the moveable mirror 420 is moved into the optical path (FIG. 8), the light signals from the first input fiber 422 are reflected back through the first collimating lens 428 into the first output fiber 424, which is parallel to and in close proximity with the first input fiber 422. The light signals from the second input fiber 430 are likewise reflected back through the second collimating lens 436 into the second output fiber 432, which is parallel to and in close proximity with the second input fiber 430.

In this mechanical optical switch, the gap between the two collimating lenses (428, 436) must be sufficiently large to allow movement of the movable mirror 420 between the two collimating lenses. However, this gap has a significant effect on insertion losses across the switch. For this reason, the gap is preferably less than about 2.0 mm in width. In addition, in a fixed collimator system initially without a mirror, the insertion of a two-surface mirror will introduce an insertion loss in an input/output port proportional to a thickness of the two-surface mirror.

Figure 9:
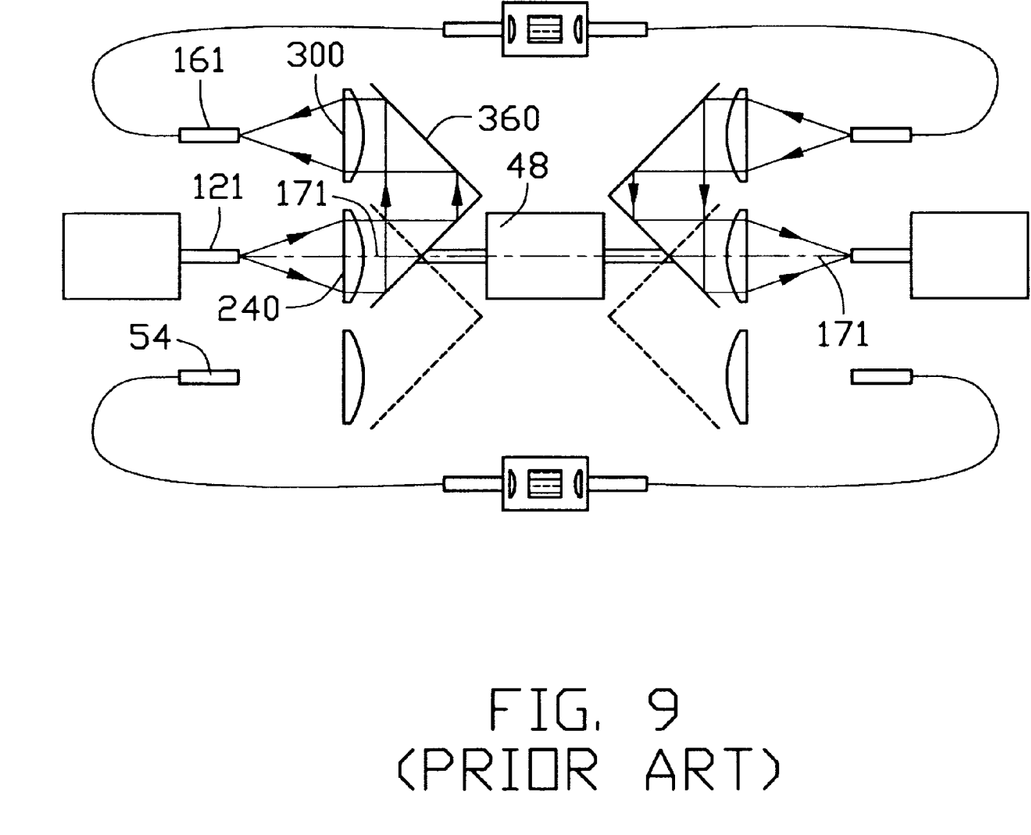
FIG. 9 is an optical elements cross-sectional view of another prior art mechanical optical switch.

Referring to FIG. 9, U.S. Pat. No. 5,481,631 discloses another mechanical optical switch, in which a stepper motor 48 rotates a retroreflector 360 about a primary axis 171 to each of a plurality of selected positions to provide optical switching for light transmission between a primary fiber 121 and any of a plurality of selected secondary fiber (161, 54). The retroreflector 360 includes a pair of lenses 300, 240 and two reflection surfaces (not labeled). The rotation of the retroreflector 360 needs much space, which makes this mechanical optical switch large in size.

For the above reasons, an improved optical switch is desired. In particularly, an optical switch is desired which has high optical efficiency and which does not require precise alignment or movement of the optical fibers themselves.

SUMMARY OF THE INVENTION

An object of the present invention is to provide an optical switch in which the optical fibers are stationary.

Another object of the present invention is to provide an optical switch which allows easy alignment of associated fibers and which has a low insertion loss.

Yet another object of the present invention is to provide an optical switch which uses a plurality of optical components as a switching element.

An optical switch with a moveable optical component according to the present invention comprises a housing, a first I/O port, a second I/O port, a driver and a switching element. The housing holds the first I/O port and the second I/O port in alignment with a prism of the switching element and supports the driver on a substrate of the housing. A mirror of the switching element is rotationally attached to the driver by an arm and is moveable between a first position and a second position, when the mirror is in the first position, light beams from the first and second I/O ports transmit through the prism back to the second and first I/O ports, respectively, In the second position, light beams from the first and second I/O ports are reflected back to the first and second I/O ports by the mirror. Thus light signals from input fibers are switched between two output fibers of the I/O ports.

Other objects, advantages and novel features of the invention will become more apparent from the following detailed description when taken in conjunction with the accompanying drawings.

DETAILED DESCRIPTION OF THE INVENTION

Figure 1:
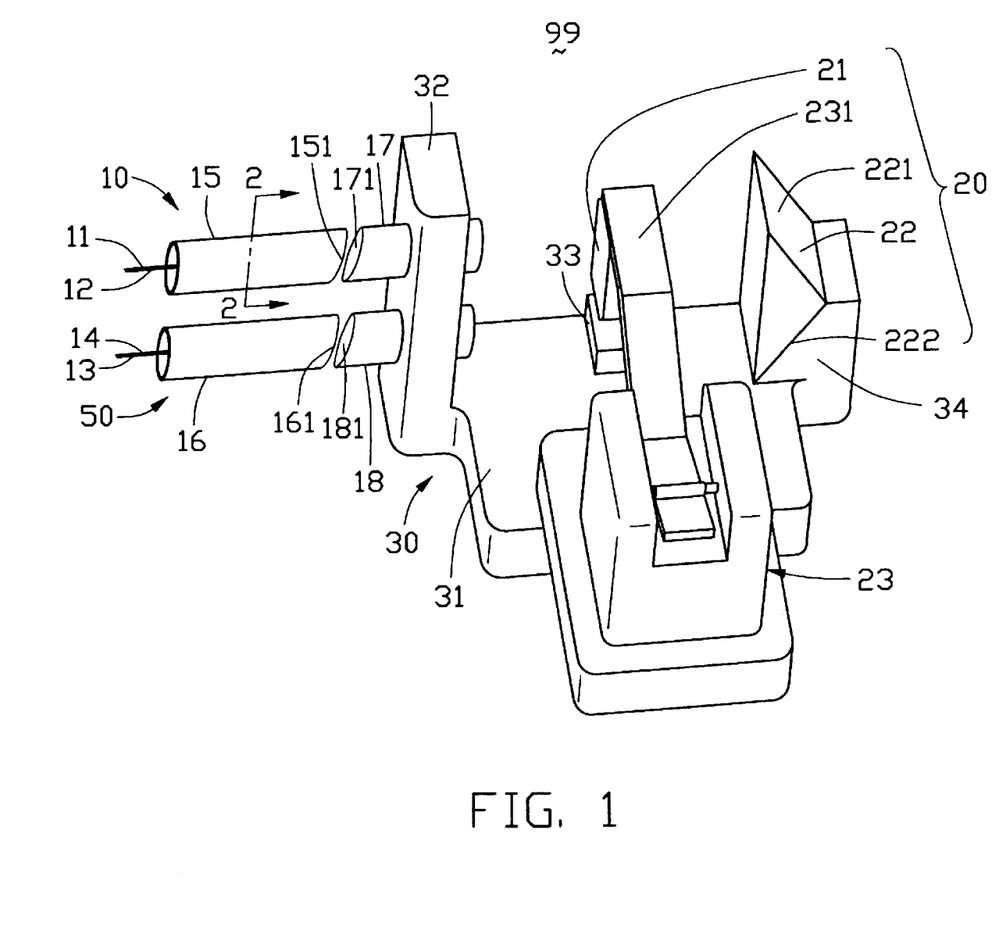
FIG. 1 is a perspective view of an optical switch with a moveable optical component according to the present invention.
Figure 2:
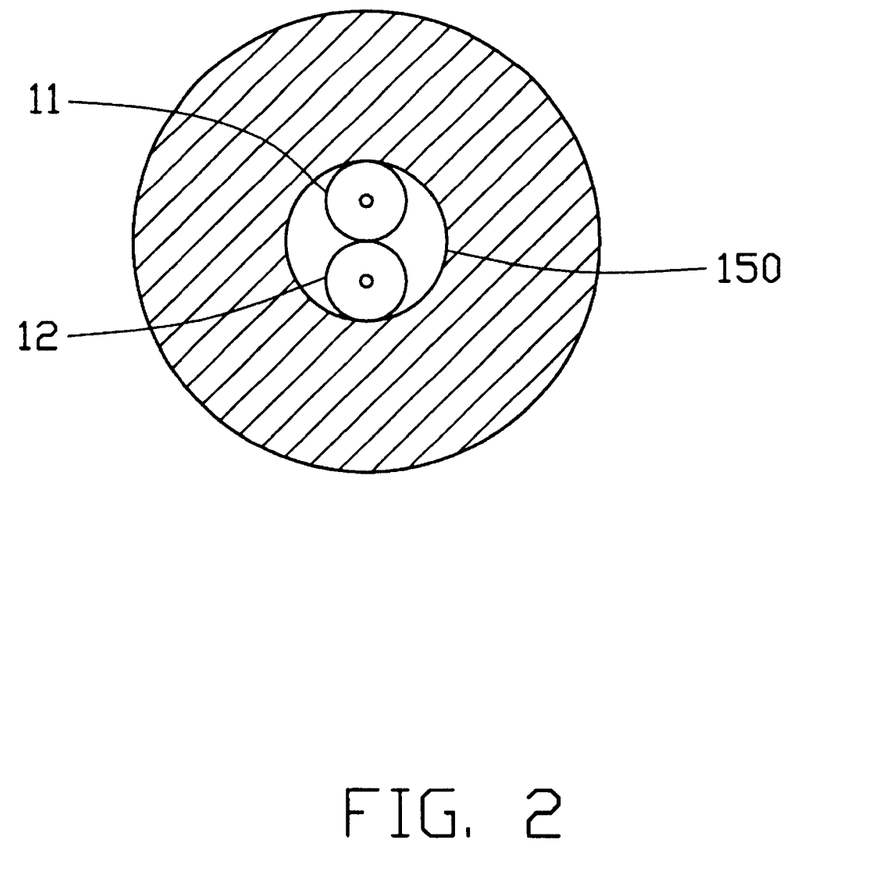
FIG. 2 is a cross-sectional view taken along the line 2—2 in FIG. 1.

As shown in FIGS. 1 and 2, an optical switch 99 according to the present invention comprises a housing 30, a first I/O port 10, a second I/O port 50, a driver 23 and a switching element 20. The housing 30 includes a substrate 31 forming a base of the housing 30, two upright beams 32, 34 extending upward at a front of the substrate 31 and a stopper 33 extending upward from the substrate 31 between the two upright beams 32, 34. The driver 23 is fixed to and extends upward from a rear of the substrate 31.

The switching element 20 comprises a moving arm 231 having a rear end (not labeled) adapted for connecting with the driver 23, a prism 22 mounted on the upright beam 34 and a mirror 21 attached to a forward end (not labeled) of the moving arm 231. The mirror 21 is moveable in an arc from a position out of an optical path to a position within the optical path from the two I/O ports 10, 50 to the prism 22. The arc of movement of the mirror 21 intersects the stopper 33 at its lowest point. A cross-section of the prism 22 discloses an equilateral right triangle, two reflecting surfaces 221, 222 are plated on the two equilateral planes.

The first I/O port 10 includes a first DFP (dual fiber pigtail) 15 and a first collimator 17. The first DFP 15 has an angled front surface 151, and the first collimator 17 has an angled back surface 171. The first DFP 15 and the first collimator 17 are held in fixed relation by using epoxy or solder between the angled front and back surfaces 151, 171. The first collimator 17 is a quarter pitch GRIN lens, or can instead be a 0.23 pitch GRIN lens.

The first DFP 15 is an elongate tube having a hollowed out interior aperture 150 extending longitudinally therethrough. The aperture 150 accommodates a first input fiber 11 and a first output fiber 12.

The second I/O port 50 is just like the first I/O port 10, and includes a second collimator 18 having an angled back surface 181 and a second DFP 16 having angled front surface 161. An interior aperture 160 of the second DFP 16 accommodates a second input fiber 13 and a second output fiber 14.

In assembly, the first I/O port 10 and the second I/O port 50 are engaged with the upright beam 32, and the prism 22 is fixed on the upright beam 34. The two upright beams 32, 34 hold the first and second I/O ports 10, 50 in alignment with the prism 22. The mirror 21 is attached to the moving arm 231 and the moving arm 231 of the switching element 20 is rotationally attached to the driver 23 by its rear end.

Responding to electrical signals, the driver 23 is actuated to drive the mirror 21 either upward into a first position, out of the optical path between the two I/O ports 10, 50 and the aligned prism 22, or downward into a second position, wherein the mirror 21 intercepts the optical path from the two I/O ports 10, 50 and reflects light beams from the first and second I/O 10, 50 back to the first and second I/O ports 10, 50. The stopper 33 limits the downward movement of the mirror 21.

Figure 3:
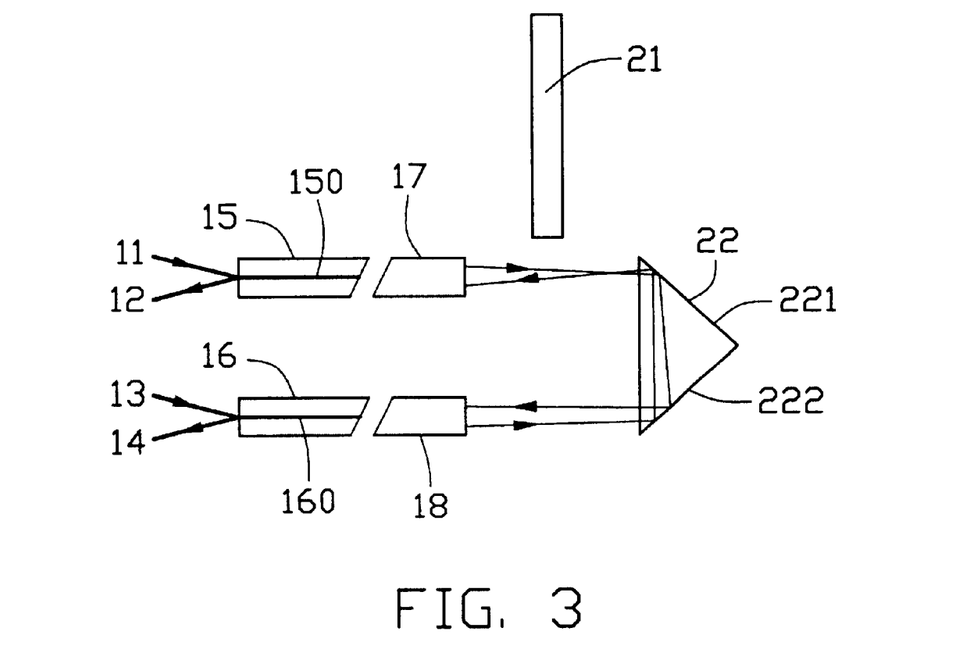
FIG. 3 is an optical elements cross-sectional view of the optical switch with moveable optical component of FIG. 1 in a first position.
Figure 4:
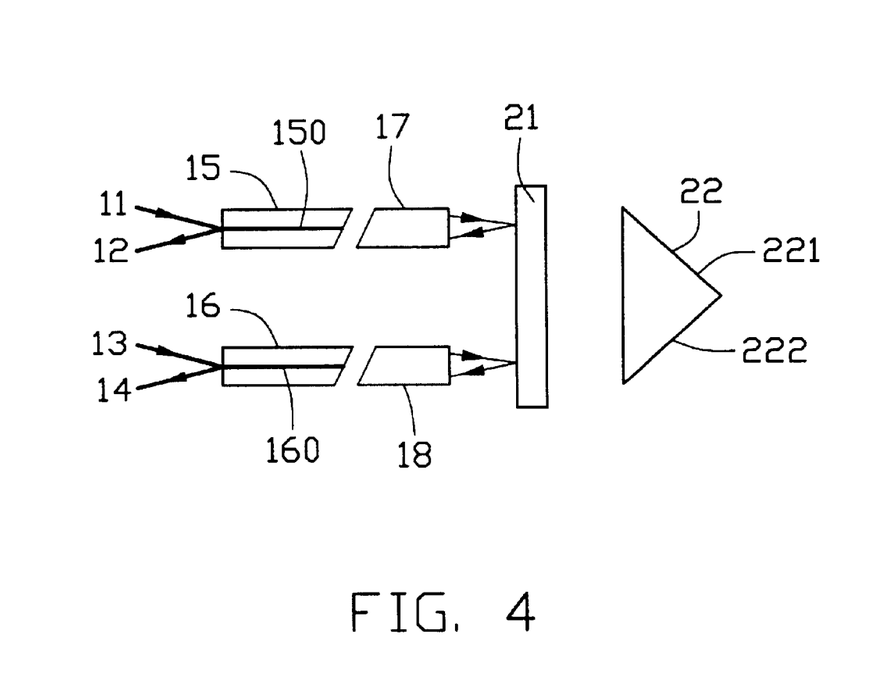
FIG. 4 is an optical elements cross-sectional view of the optical switch with moveable optical component of FIG. 1 in a second position.

FIGS. 3 and 4 illustrate the operation of the optical switch 99. In the first position (FIG. 3), the mirror 21 is in the upward position and the prism 22 intercepts light beams from the first and second collimators 17, 18. Light beams from the first and second input fibers 11, 13 transmit to the reflecting surfaces 221, 222, where they are reflected to the two reflecting surfaces 222, 221, respectively, and are then reflected and transmitted through the second and first collimator 18, 17 to the second and first output fibers 14, 12, respectively.

In the second position (FIG. 4), the mirror 21 is in the downward position, where the mirror 21 intercepts light beams transmitting from the first and second I/O ports 10, 50. In this position, light beams from the first and second input fibers 11, 13 are transmitted through the first and second collimators 17, 18, reflect off of the mirror 21 and are then transmitted back through the first and second collimators 17, 18 to the first and second output fibers 12, 14, respectively. The mirror 21 thus reflects a switching of the light beams from the first and second input fibers 11, 13 between the first and second output fibers 12, 14.

Figure 5:
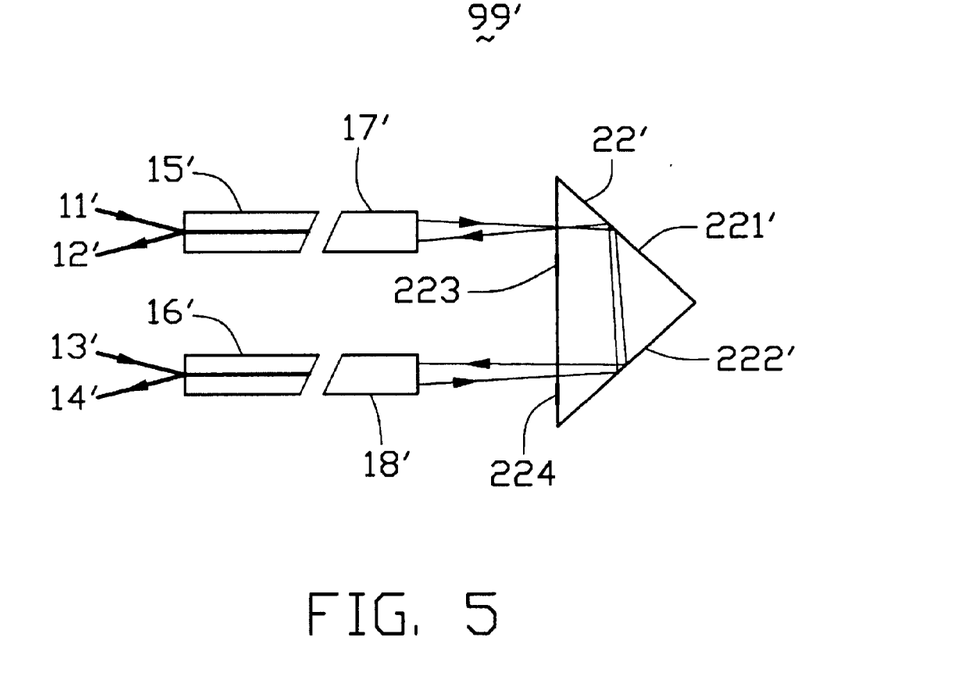
FIG. 5 is an optical elements cross-sectional view of a second embodiment of an optical switch with a moveable optical component in a first position.
Figure 6:
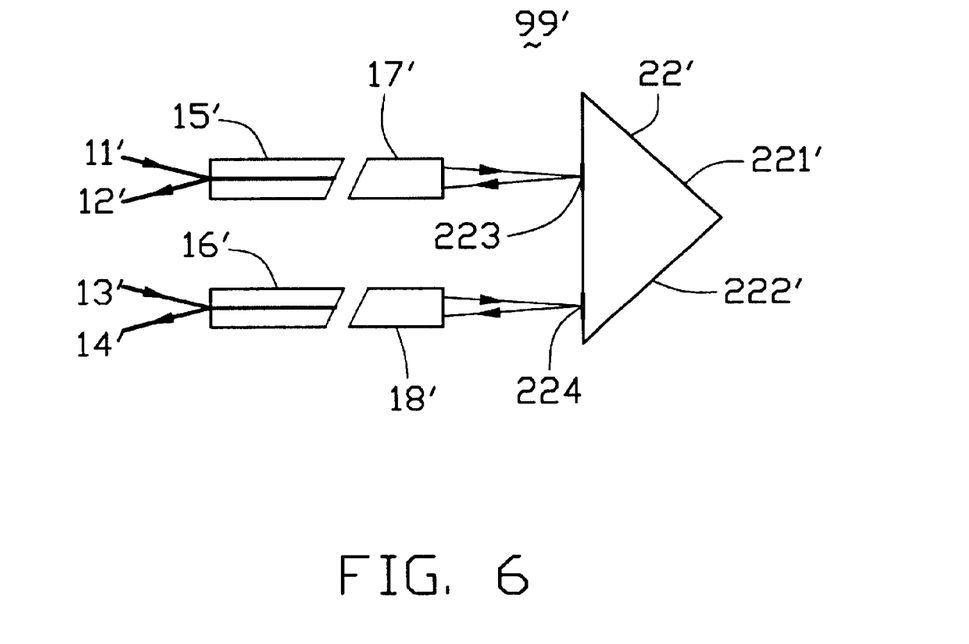
FIG. 6 is an optical elements cross-sectional view of the second embodiment of optical switch with a moveable optical component of FIG. 5 in a second position.

FIGS. 5 and 6 show drawings describing operation of a second embodiment of an optical switch 99' in accordance with the present invention. The optical switch 99' has a moveable prism 22' to effect switching of input light beams between the output fibers 12', 14'. The prism 22' has a cross-section describing an equilateral right triangle, with a first reflecting surface 221' and a second reflecting surface 222' being plated on the equilateral planes. A third and fourth reflecting surfaces 223, 224 are plated on the plane of the hypotenuse. The prism 22' moves between a first position, wherein the third and fourth reflecting surfaces 223, 224 are out of the optical path of light beams emanating from the first and second input fibers 11', 13', and a second position, wherein the third and fourth reflecting surface 223, 224 are in the optical path of light beams from the first and second input fibers 11', 13', respectively.

In the first position (FIG. 5), the prism 22' is in the downward position. Light beams from the first and second input fibers 11', 13' respectively are transmitted to and reflect off of the reflecting surfaces 221', 222', and are then transmitted to the and reflect off of the reflecting surfaces 222', 221' through the second and first collimator 18', 17' to the second and first output fibers 14', 12'.

In the second position (FIG. 6), the prism 22' is in the upward position, where the first and second collimators 17', 18' align with the third and fourth reflecting surfaces 223, 224. In this position, light beams from the first and second input fibers 11', 13' are transmitted through the first and second collimators 17', 18' and reflect off of the third and fourth reflecting surface 223, 224, and then transmit back through the first and second collimators 17', 18' to the first and second output fibers 12', 14', respectively.

The optical switch 99 of the present invention uses a moveable mirror and a prism as a switching element, thereby avoiding moving fibers. Alignment is easily realized and low insertion loss is achieved by using the switching element 20 with a moveable mirror 21 and a prism 22 to replace two-reflecting-surface mirrors of the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the diameter of the DFP 15, 16 could be altered to accommodate more than two fibers to produce a N×N optical switch.

We claim:

1. An optical switch for switching light signals coming from first and second input fibers between first and second output fibers, comprising:
    a first collimator aligning with the first input and first output fibers and collimating input and output light;
    a second collimator aligning with the second input and second output fibers and collimating input and output light; and
    a switching element comprising a mirror and a prism, the prism having at least a first and second reflecting surfaces, the mirror being moveable between a first position and a second position;
    whereby, when the mirror is in the first position, light beams from the first and second input fibers transmit sequentially through the first and second collimators, the prism, the second and first collimators and then to the second and first output fibers, respectively; and when the mirror is in the second position, the light beams from the first and second input fibers transmit through the first and second collimators, are reflected by the mirror, and retransmit through the first and second collimators to the first and second output fibers, respectively.

2. The optical switch of claim 1, wherein the first and second reflecting surfaces are opposite to and aligned with the first and second collimators, respectively.

3. The optical switch of claim 2, wherein the light beams transmitted through the prism are reflected twice by the first and second reflecting surfaces of the prism.

4. The optical switch of claim 3, wherein the first collimator collimates light from the first input fiber and light reflected by the mirror or the reflecting surfaces.

5. The optical switch of claim 4, wherein the second collimator collimates light from the second input fiber and light reflected by the mirror or the reflecting surfaces.

6. The optical switch of claim 1, further comprising a first dual fiber pigtail (DFP), retaining the first input and output fibers.

7. The optical switch of claim 6, further comprising a second DFP, retaining the second input and output fibers.

8. The optical switch of claim 1, further comprising a driver which drives the mirror to move between the first position and the second position.

9. An optical switch with for switching light signals coming from first and second input fibers between first and second output fibers, comprising:
    a first collimator aligning with the first input and first output fibers and collimating input and output light;
    a second collimator aligning with the second input and second output fibers and collimating input and output light; and
    a switching element comprising a moveable prism with at least a first, second and third reflecting surfaces, the prism moving between a first position, wherein the first and second collimators align with the first and second reflecting surfaces, respectively, a second position, wherein the first and second collimators align with the third reflecting surface;
    whereby, when the switching element is in the first position, light beams from the first and second input fibers transmit sequentially through the first and second collimators, the prism, the second and first collimators, and then to the second and first output fibers, respectively; and when the switching element is in the second position, the light beams from the first and second input fibers transmit through the first and second collimators, are reflected by the third reflecting surface of the prism, and retransmit through the first and second collimators to the first and second output fibers, respectively.

10. The optical switch of claim 9, wherein the first and second reflecting surfaces of the prism are opposite to the first and second collimators, respectively.

11. The optical switch of claim 10, wherein the light beams transmitting through the prism are reflected twice: once by the first, and once by the second, reflecting surfaces of the prism.

12. The optical switch of claim 11, wherein the first collimator collimates light from the first input fiber and light reflected by the reflecting surfaces.

13. The optical switch of claim 12, wherein the second collimator collimates light from the second input fiber and light reflected the reflecting surfaces.

14. The optical switch of claim 9, further comprising a first dual fiber pigtail (DFP), retaining the first input and output fibers.

15. The optical switch of claim 14, further comprising a second DFP, retaining the second input and output fibers.

16. The optical switch of claim 9, further comprising a driver which drives the switching element to move between the first position and the second position.

17. An optical switch with for switching light signals coming from first and second input fibers between first and second output fibers, comprising:
    a first collimator aligning with the first input and first output fibers and collimating input and output light;
    a second collimator aligning with the second input and second output fibers and collimating input and output light; and
    a switching element comprising a moveable reflecting surface and at least two fixed reflecting surfaces, the moveable reflecting surface moving between a first position, wherein each collimator aligns with a respective one of the two fixed reflecting surfaces, and a second position, wherein both collimators align with the moveable reflecting surface;
    whereby, when the switching element is in the first position, light beams from the first and second input fibers sequentially transmit through the first and second collimators, reflect off of the two fixed reflecting surfaces, transmit through the second and first collimators, and then transmit to the second and first output fibers, respectively; and when the switching element is in the second position, the light beams from the first and second input fibers transmit through the first and second collimators, are reflected by the moveable reflecting surface, and retransmit through the first and second collimators to the first and second output fibers, respectively.

18. An optical switch assembly comprising:

a first I/O port including first input and output fibers and a first collimator;

a second I/O port including second input and output fibers and a second collimator; and a moveable switching element positioned on same sides of both said first and second collimator and thus directly facing to both said first and second collimators;

wherein, via different positions of said switching element, light entering from the first input fiber and leaving via the first output fiber and light entering from the second input fiber and leaving via the second output fiber respectively experience only one reflection, while light enters from the first input fiber and leaving via the second output fiber and light enters from the second input fiber and leaving via the first output fiber respectively experiences two reflections.

19. The assembly of claim 18, wherein said switching element is moved along a direction about perpendicular to a light path emitting from said first collimator or said second collimator.

* * * * *